United States Patent

Shinmura

Patent Number: 5,111,865
Date of Patent: May 12, 1992

[54] TIRE AND RIM COMBINATION

[75] Inventor: Yasushi Shinmura, Shirakawa, Japan

[73] Assignee: Sumitomo Rubber Industries, Ltd., Hyogo, Japan

[21] Appl. No.: 389,802

[22] Filed: Aug. 4, 1989

[30] Foreign Application Priority Data

Aug. 11, 1988 [JP] Japan .................... 63-202559

[51] Int. Cl.⁵ .................... B60C 15/06
[52] U.S. Cl. .................... 152/542; 152/543; 152/546; 152/552; 152/554
[58] Field of Search ............ 152/539, 546, 542, 543, 152/544, 552, 554, 555

[56] References Cited

U.S. PATENT DOCUMENTS

| 4,024,901 | 5/1977 | Poqué ................... 152/546 |
| 4,726,408 | 2/1988 | Aolie et al. ............. 152/542 |
| 4,941,523 | 7/1990 | Galante et al. ........... 152/543 |

FOREIGN PATENT DOCUMENTS

| 0092905 | 5/1985 | Japan ................... 152/546 |
| 0275606 | 8/1989 | Japan ................... 152/539 |
| 2-164605 | 6/1990 | Japan ................... 152/542 |

*Primary Examiner*—Michael W. Ball
*Assistant Examiner*—Nancy T. Krawczyk
*Attorney, Agent, or Firm*—Birch, Stewart, Kolasch & Birch

[57] ABSTRACT

A tire and rim combination comprising a carcass turned up around bead cores from the axially inside to the outside thereof to form turned up portions; bead filler ply disposed between the carcass and each bead core and having an axially inner portion and an outer portion; and a chafer having a main portion extending along the bottom of the bead and an outside portion extending radially outwardly from the main portion along the axially outside the carcass turned up portion, the height F of the edge of the outer portion of the bead filler ply, the height P of the edge of the turned up portion of the carcass, the height C of the edge of the outside portion of the chafer, and the height A of the edge of a flange of said rim for the tire, the heights F, P, C and A being the height from the bead base, respectively, and satisfying the following conditions:

$0.8 \leq C/A < 1$ $0.64 \leq P/A < 0.8$ $0.4 \leq F/A < 1$

5 Claims, 4 Drawing Sheets

TIRE AND RIM COMBINATION

BACKGROUND OF THE INVENTION

The present invention relates to a pneumatic tire, and more particularly to a bead structure suitable for radial ply tires for a passenger car, which can reduce the occurrence of carcass ply turned up edge looseness and can suppress the growth of the occurred looseness to improve the durability of the tire.

In general, as shown in FIG. 3, a radial tire has a carcass ply (b) turned up around bead cores (a) from the axially inside to the outside thereof to be secured thereto, a bead filler ply (c) disposed between the bead core and the carcass to prevent the carcass cords from abrasion, and a chafer (d) disposed along the bead profile to reinforce the bottom of the bead, and on the axially outside of the bead core (a). The bead filler ply (c) and the chafer (d) are terminated radially inside the edge of the carcass ply turned up portion (e), that is, the outer edge of the turned up portion of the carcass ply is projected from the edges of the the bead filler and the chafer and extended over the outer edge of the rim flange (f).

The turned up portion (e) is therefore, apt to be subjected to a compressive stress when the sidewall is deformed as shown in FIG. 4.

More, when subjected to a large deformation, the carcass ply turned up portion is bent abruptly over the rim flange, and the compressive stress is concentrated on that portion, and finally the carcass ply is broken by the cord fatigue due to the repeated large stress, which induces a further concentration of the compressive stress. Such concentration decreases not only the carcass strength but also the rubber strength.

Thus, bead failure generally occurs near the edge of the rim flange (f).

Therefore, it has been proposed to dispose axially outward of the carcass ply turned up portion an additional reinforcing cord layer to cover the edge of the carcass ply turned up portion.

The ply separation at the carcass ply turned up edge is reduced by the added cord layer, but ply separation at the edge of the added cord layer still remains unreduced.

Such cord layer has further problems such as an increase in the thickness of the sidewall and bead, an increase in the tire weight, an increase in the heat generation therefrom and the like.

It is therefore, an object of the present invention to provide a pneumatic tire and rim combination for reducing ply separation at the edge of the carcass ply turned up portion, and suppressing the growth of ply separation if caused without adding any reinforcing cord layer.

SUMMARY OF THE INVENTION

According to one aspect of the present invention, a pneumatic tire comprises:

a pair of bead cores disposed one in each bead of the tire;

a carcass extending across the beads and turned up around the bead cores from the axially inside to the outside thereof to form two turned up portions one on each side of the main portion;

a bead filler ply disposed between the carcass and each of the bead cores and extending radially outwardly from the bead core to form an axially inner portion and an outer portion; and a chafer having a main portion extending along the bottom of the bead and an outside portion extending radially outwardly from the main portion along the axially outside the carcass turned up portion, wherein the height F of the edge of the outer portion of the bead filler ply the height P of the edge of the turned up portion of the carcass, the height C of the edge of the outside portion of the chafer, and the height A of the edge of a flange of a standard rim for the tire, satisfy the following conditions:

$$0.8 \leq C/A < 1$$

$$0.64 \leq P/A < 0.8$$

$$0.4 \leq F/A < 1$$

the heights F, P, C and A being measured from the bead base L, defined as the point of intersection of the bead seat of the rim and the flange of the rim.

Since each height of the bead filler ply, carcass and chafer from the bead bottom is smaller than that of the rim flange, the edge portions thereof have small compressive stress even when subjected to a large deformation. Accordingly, there is little possibility that the edge will be separated.

Moreover, as the carcass ply turned up edge never projects from the bead filler ply, the chafer can suppress the growth of separation of the carcass ply even if any separation is generated at the edge, and by preventing the breakage of the bead, the durability and stability of the tire can be enhanced.

BRIEF DESCRIPTION OF THE DRAWINGS

An embodiment of the present invention will now be explained in detail with reference to the drawings, in which.

DETAILED DESCRIPTION OF THE INVENTION

Figure 1:
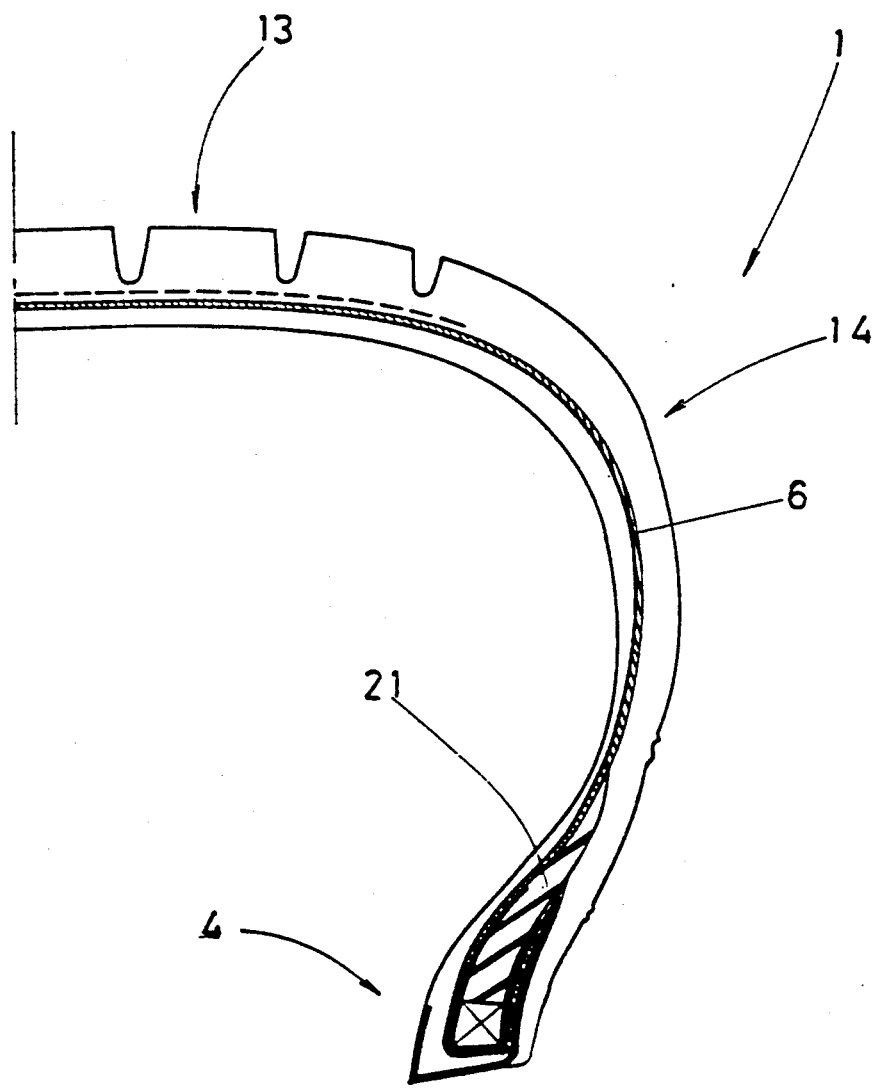
FIG. 1 is a sectional view showing an embodiment of the invention.
Figure 2:
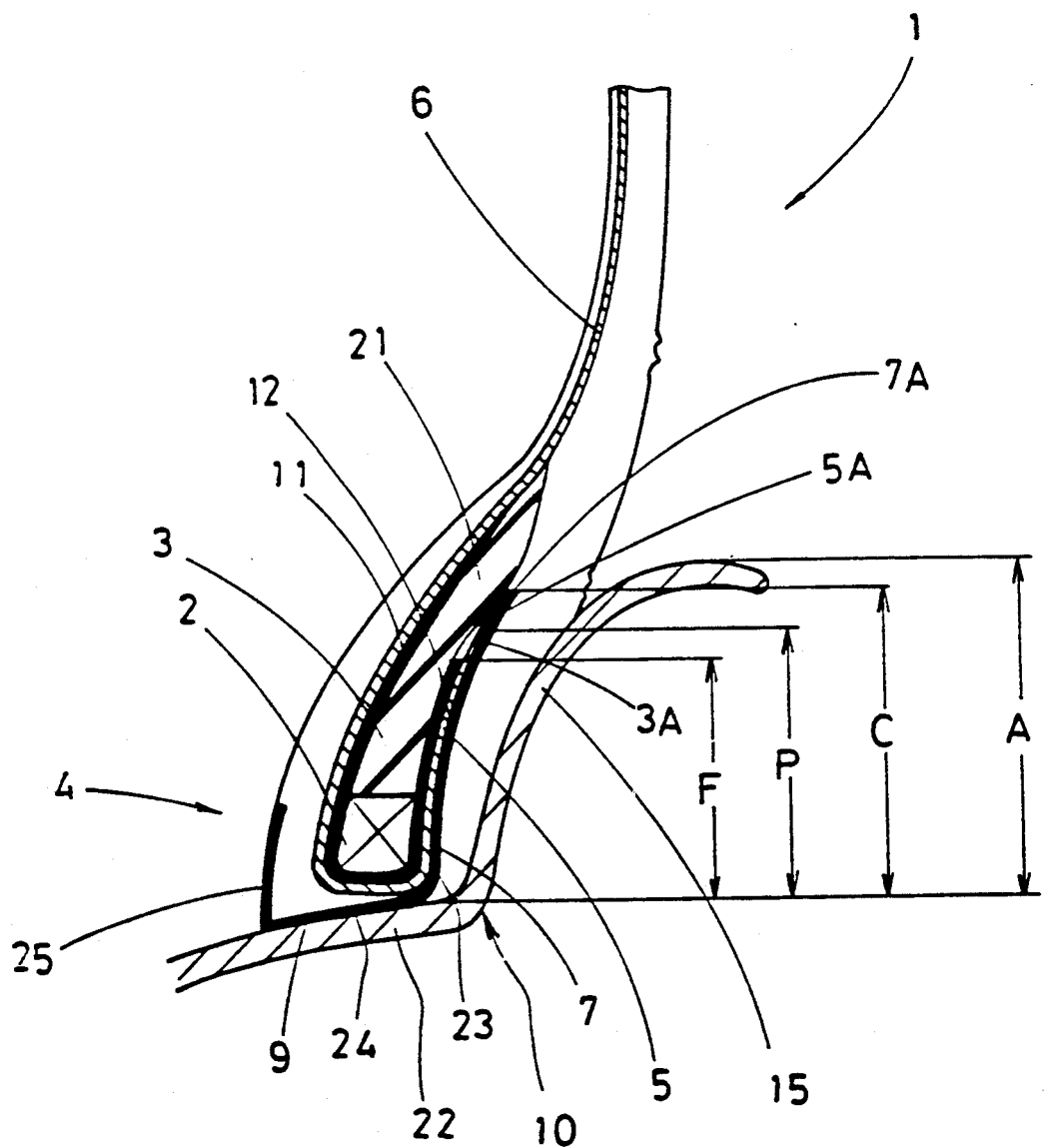
FIG. 2 is a enlarged sectional view showing the bead thereof.
Figure 3:
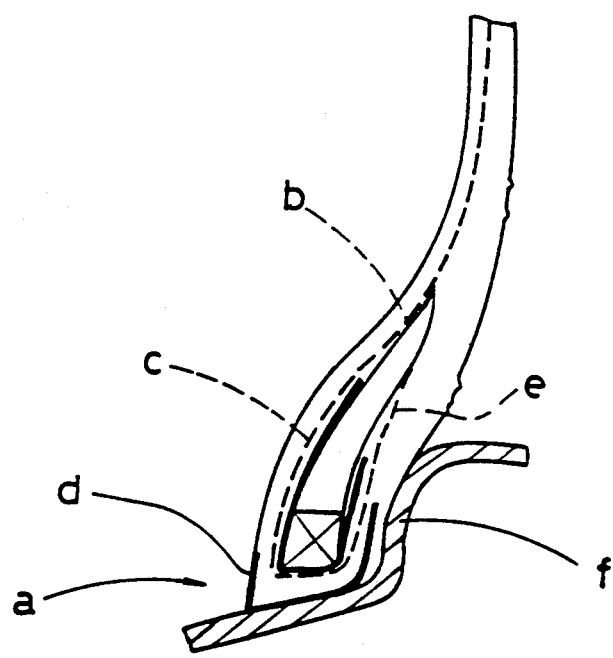
FIG. 3 is a sectional view showing a conventional bead.
Figure 4:
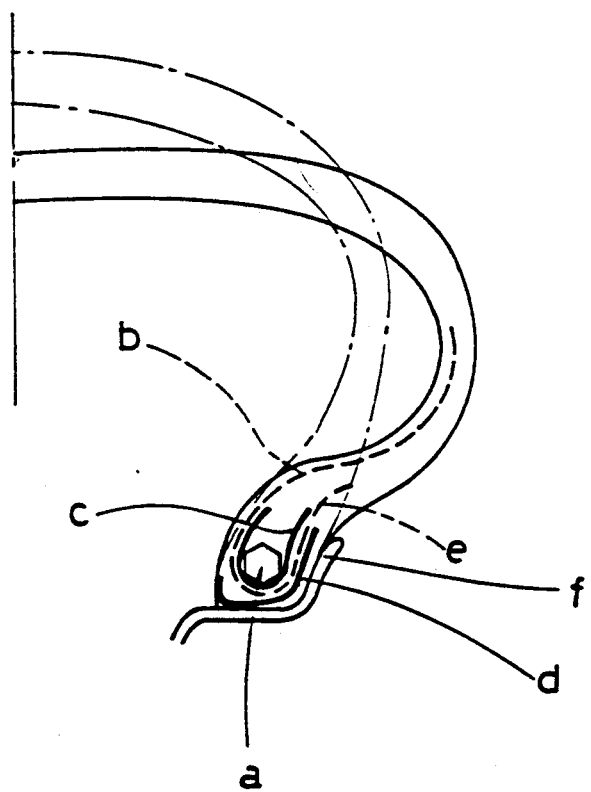
FIG. 4 is a diagram showing a deformation of a tire.

In FIGS. 1 and 2, a tire 1 of the invention is for a passenger car, and the tire has a pair of bead portions 4, a pair of sidewall portions 14 and a tread portion 13. The tire 1 comprises a radial carcass 6; a rubber tread disposed on the carcass; a breaker between the tread and the carcass; and a bead core 2, a bead filler ply 3 and a chafer 7 disposed in each bead portion.

The tire 1 is mounted on a standard rim 10, that is, the beads are designed so that the bead bottom 9 fits a bead seat of a conventionally standardized rim 10.

The carcass 6 extends across the bead portions through the tread portion 13 and the sidewall portions 14, and the carcass is turned up around the bead cores 2 from the axially inside to the outside thereof, thereby forming a radially outwardly extending carcass turned up portion 5 in each bead region.

The carcass 6 is composed of one or more plies of rubberized organic fiber cords or metallic cords, in this embodiment, polyester fiber cords arranged at 90 to 80 degrees to the radial direction at a density of 50 to 65 ends.

The bead filler ply 3 is disposed between the carcass and the bead core to prevent the abrasion of the carcass 6 which moves like a belt on a pulley according to the repeated deformation of the tire.

The bead filler ply is folded around the bead core 2 so that the axially inner portion 11 and outer portion 12 thereof extend radially outwardly along the carcass.

The bead filler ply 3 is composed of at least one ply of rubberized organic fiber cords, in this embodiment, nylon fiber cords arranged at a density of 20 to 35 ends.

The chafer 7 is composed of a rubberized canvas, that is, woven organic fiber cords. In this embodiment, Vinylon cords are used, and the cord density is 45 to 50 ends.

The chafer 7 comprises a main portion 24 coming into contact with the rim 10 and an axially inner portion 25 and an axially outer portion 23 extending radially outwardly from the inner edge and outer edge of the main portion 24, respectively.

The main portion 24 of the chafer extends along the bottom 9 of the bead portion 4 from the innermost edge to a position inward of the outermost edge defining most part of the bottom surface of the bead. The axially inner portion 25 extends along the inside of the bead. The axially outer portion 23 extends along the axially outside of the carcass turned up portion 5 in direct contact therewith.

Further, each bead portion is provided with a bead apex 21 made of a hard rubber. The bead apex is disposed radially outward of the bead core between the inner and outer portions of the bead filler ply, and extends taperingly from the bead core over the upper ends of the inner and outer portions of the bead filler ply to enhance the stiffness of the bead 4.

On the other hand, the above-mentioned rim 10 comprises a pair of bead seats 22 to which the bottom 9 of the bead 4 fits and a pair of flanges 15 extending along the outside of the beads.

The rim 10 is a standard rim manufactured according to the standards established by JATMA (Japan Automobile Tire Manufactures' Association, Inc.) to derive the most effective performance from a tire. That is, selecting the size and type of tire, the flange height of a standard rim for the tire is given.

The height C of the upper end 7A of the outer portion 23 of the chafer 7 is smaller than the height A of the rim flange 15, both from the bead base L, and the ratio C/A is not smaller than 0.8 and smaller than 1.

The height P of the upper end 5A of the turned up portion 5 of the carcass 6 from the bead base L is smaller than the height A of the rim flange 15, and the ratio P/A is not smaller than 0.64 and smaller than 0.8.

Moreover, the height F of the upper end 3A of the outer portion 12 of the bead filler ply 3 from the bead base L is smaller the height A of the rim flange 15, and the ratio F/A is not smaller than 0.4 and smaller than 1.

Accordingly, the upper end 5A of the turned up portion 5 of the carcass is covered axially outwardly by the outer portion 23 of the chafer 7.

As a result, even when the bead 4 is subjected to the repeated deformation, the chafer 7 can prevent the carcass turned up portion 5 from being moved radially inward, that is, the loosening of the carcass 6 is effectively prevented.

Further, as the chafer 7 directly contacts the axially outside of the carcass turned up portion 5, not only is the above-mentioned effect substantially improved but also the chafer can effectively prevent the growth of the loosening in the bead portion, thereby preventing breakage of the bead 4.

Furthermore, by regulating the lower limit for the bead filler ply height as described above, the movement of the carcass like the belt on a pulley can be made smooth.

COMPARISON TEST

Changing the heights C, P and F of the chafer, carcass turned up portion and bead filler ply as shown in TABLE 1, test tires of size P215/75R15 were produced by way of trial.

Each tire was mounted on a 6JJ×15 rim having 25 mm height flanges, a standard rim for this size of tires and inflated to a regular pressure, and then performance tests were executed by using a drum testing machine.

The test results are also shown in TABLE 1, wherein the letter-O indicates that the carcass ply edge was not loosened, and the letter-X indicates that the carcass ply edge was loosened.

As apparent from TABLE 1, in each of the tires Ref. 1-7, there was observed the loosening at the edge of the carcass turned up portion, but the tires Ex. 1-7 according to the present invention had no such loosening.

As explained above, the carcass ply turned up portion is lowered and the outside portion of the chafer is increased in height in comparison with the conventional tire so that the chafer covers the edge of the carcass ply turned up portion.

Accordingly, the occurrence of ply separation at the carcass ply turned up edge can be reduced by the chafer without using any additional reinforcing layer.

Further, as the edges of the carcass ply, the bead filler ply and the chafer are made lower than these edges of the rim flange, the edges are prevented from being subjected to compressive stress and also stress concentration, which can greatly enhance the reduction of ply separation by the chafer.

Therefore, such structures can prevent the loosening at the edge of the carcass turned up portion in cooperation with each other. In addition, even if the loosening occurs, the growth of such loosenes can be suppressed and the breakage of the bead can be effectively prevented. As the result, the durability of the tire is improved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

TABLE 1

| Example | | | 1 | 2 | 3 | 4 | 5 | 6 | 7 |
|---|---|---|---|---|---|---|---|---|---|
| Chafer height | C | mm | 23 | 22 | 20 | 22 | 22 | 24 | 22 |
| Carcass turned up height | P | mm | 17 | 18 | 18 | 19 | 18 | 19 | 19 |
| Bead filler ply height | F | mm | 13 | 16 | 15 | 17 | 19 | 19 | 18 |
| Rim flange height | A | mm | 25 | 25 | 25 | 25 | 25 | 25 | 25 |
| C/A | | | .92 | .88 | .80 | .88 | .88 | .96 | .88 |

TABLE 1-continued

| | | | 1 | 2 | 3 | 4 | 5 | 6 | 7 |
|---|---|---|---|---|---|---|---|---|---|
| P/A | | | .68 | .72 | .72 | .76 | .72 | .76 | .76 |
| F/A | | | .52 | .64 | .60 | .63 | .76 | .76 | .72 |
| Judgement | | | ○ | ○ | C | C | C | C | ○ |
| Reference | | | 1 | 2 | 3 | 4 | 5 | 6 | 7 |
| Chafer height | C | mm | 19 | 14 | 19 | 21 | 12 | 21 | 18 |
| Carcass turned up height | P | mm | 20 | 16 | 20 | 21 | 22 | 23 | 20 |
| Bead filler ply height | F | mm | 8 | 13 | 23 | 22 | 17 | 17 | 17 |
| C/A | | | .76 | .56 | .76 | .84 | .48 | .84 | .72 |
| P/A | | | .80 | .64 | .80 | .84 | .88 | .92 | .80 |
| F/A | | | .32 | .52 | .92 | .88 | .68 | .68 | .68 |
| Judgement | | | X | X | X | X | X | X | X |

I claim:

1. A tire and rim combination comprising:
a tire;
a rim supporting said tire;
a pair of bead cores disposed one in each bead of said tire;
a carcass turned up around the bead cores from the axially inside to the outside thereof to form two turned up portions;
a bead filler ply disposed between the carcass and each bead core and extending radially outwardly from the bead core to form an axially inner portion and an outer portion; and
a chafer having a main portion extending along the bottom of the bead and an outside portion extending radially outwardly from the main portion along the axially outside the carcass turned up portion,
the height F of the edge of the outer portion of the bead filler ply,
the height P of the edge of the turned up portion of the carcass,
the height C of the edge of the outside portion of the chafer,
and the height A of the edge of a flange of said rim for the tire, the heights F, P, C and A being the height from the bead base, respectively, and satisfying the following conditions:

$0.8 \leq C/A < 1$, $0.64 \leq P/A < 0.8$, and $0.4 \leq F/A < 1$.

2. A tire and rim combination comprising:
a tire;
a rim supporting said tire;
a pair of bead cores disposed one in each bead of said tire;
a carcass turned up around the bead cores from the axially inside to the outside thereof to form two turned up portions;
a bead filler ply disposed between the carcass and each bead core and extending radially outwardly from the bead core to form an axially inner portion and an outer portion; and
a chafer having a main portion extending along the bottom of the bead and an outside portion extending radially outwardly from the main portion along the axially outside the carcass turned up portion,
the height F of the edge of the outer portion of the bead filler ply,
the height P of the edge of the turned up portion of the carcass,
the height C of the edge of the outside portion of the chafer,
and the height A of the edge of said flange of said rim for the tire, the heights F, P, C and A being the height from the bead base, respectively, and satisfying the following conditions:

$A > C$, $C > P$, and $C > F$.

3. The tire and rim combination according to claim 2 wherein the height F of the edge of the outer portion of the bead filler ply, the height P of the edge of the turned up portion of the carcass, the height C of the edge of the outside portion of the chafer, and the height A of the edge of the rim flange satisfy the following conditions:

$A > C > P > F$.

4. The tire and rim combination according to claim 2 wherein the height F of the edge of the outer portion of the bead filler ply, the height P of the edge of the turned up portion of the carcass, the height C of the edge of the outside portion of the chafer, and the height A of the edge of the rim flange satisfy the following conditions:

$0.8 \leq C/A < 1$, $0.64 \leq P/A < 0.8$, and $0.4 \leq F/A < 1$.

5. The tire and rim combination according to claim 2 wherein the carcass is composed of at least one ply of polyester fiber cords arranged at 90 to 80 degrees to the radial direction, the bead filler ply is composed of at least one ply of nylon fiber cords, and the chafer is composed of a Vinylon canvas.

* * * * *